(No Model.) 4 Sheets—Sheet 1.
L. M. VA. DE GONZALEZ.
COMBINED TIME INDICATOR AND TRIP RECORDING APPARATUS.
No. 552,957. Patented Jan. 14, 1896.
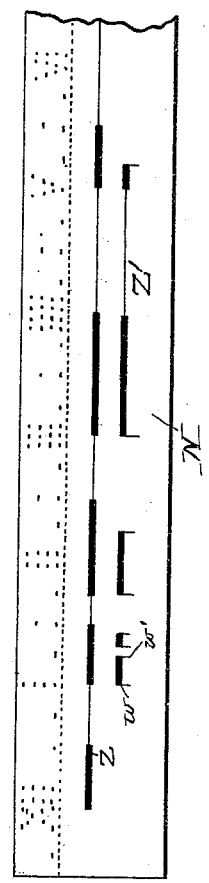
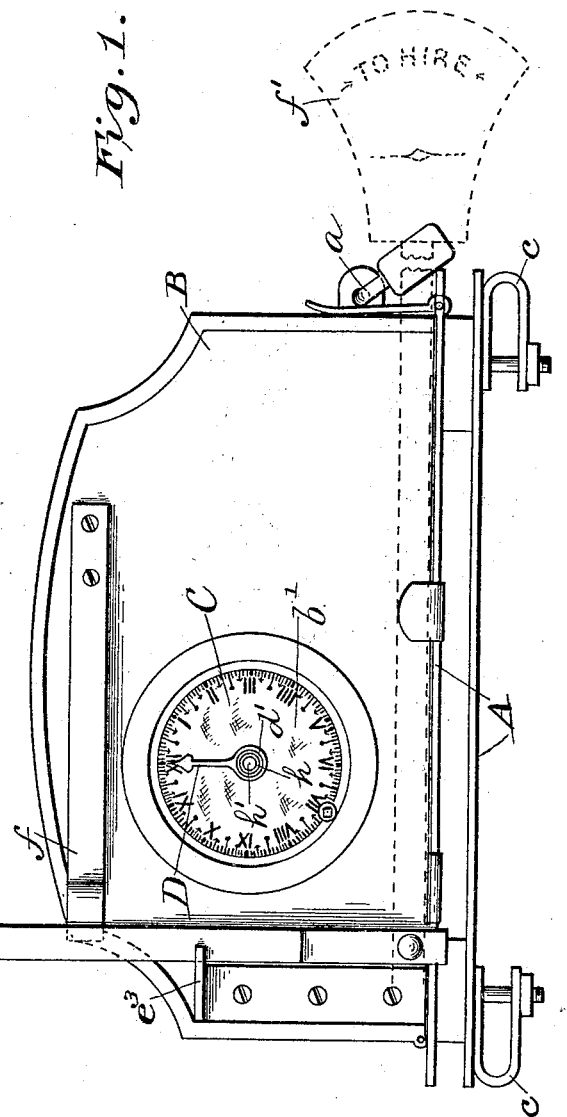

(No Model.) 4 Sheets—Sheet 2.
L. M. VA. DE GONZALEZ.
COMBINED TIME INDICATOR AND TRIP RECORDING APPARATUS.
No. 552,957. Patented Jan. 14, 1896.

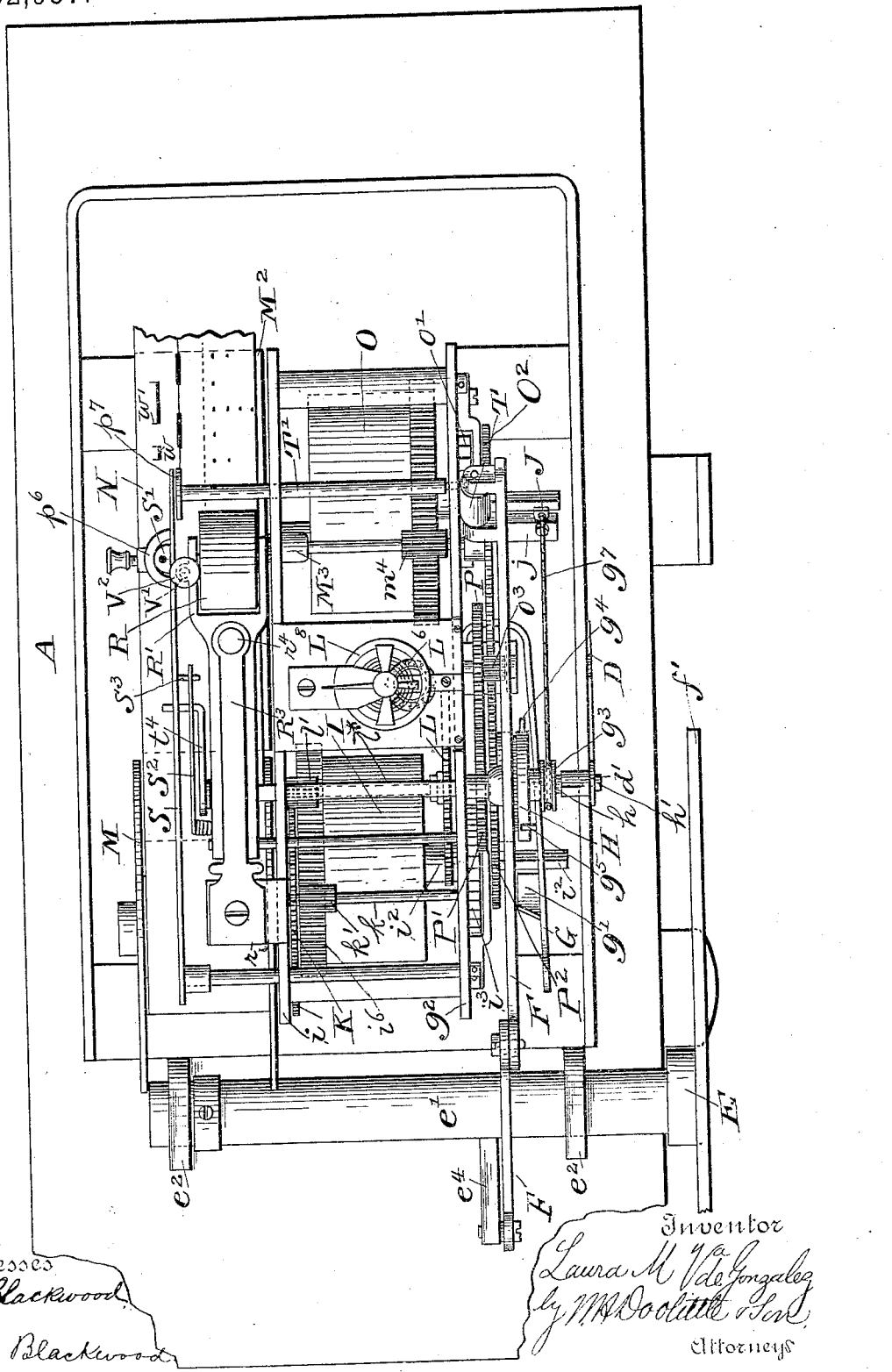

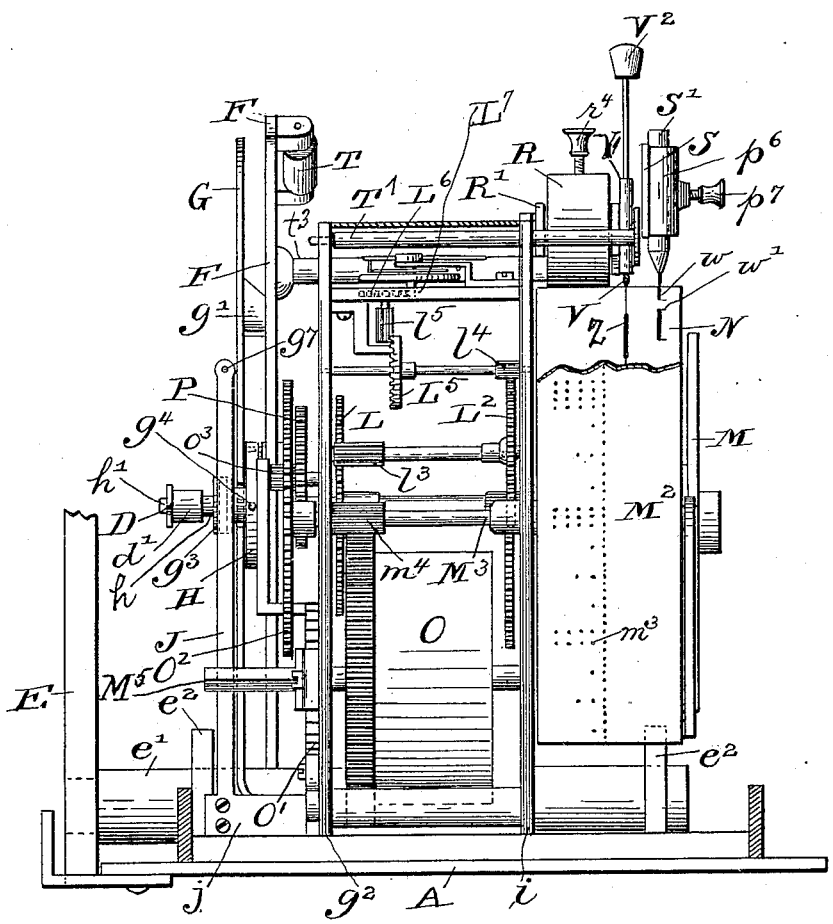

UNITED STATES PATENT OFFICE.

LAURA M. VA. DE GONZALEZ, OF MEXICO, MEXICO.

COMBINED TIME-INDICATOR AND TRIP-RECORDING APPARATUS.

SPECIFICATION forming part of Letters Patent No. 552,957, dated January 14, 1896.

Application filed July 29, 1895. Serial No. 557,437. (No model.) Patented in Mexico September 18, 1894, No. 610.

*To all whom it may concern:*

Be it known that I, LAURA MANTECOU VA. DE GONZALEZ, a citizen of Mexico, residing at the city of Mexico, in the Republic of Mexico, have invented certain new and useful Improvements in a Combined Time-Indicator and Trip-Recording Apparatus; and I do hereby declare the following to be a full, clear, and exact description of the invention, such as will enable others skilled in the art to which it appertains to make and use the same.

My invention relates to passenger-registers; and it consists of a combined time-indicator and trip-recording apparatus, for which Letters Patent were granted me in Mexico September 18, 1894, No. 610.

The objects of my invention are to record automatically in an apparatus carried by a cab, carriage, or other vehicle the length of time which a passenger at each trip is carried, whereby the passenger and driver are both informed as to the exact time consumed, and the amount of fare to be paid, and also whereby at the close of the day's services the owner of the vehicle or vehicles may be informed by a simple inspection of the apparatus of the number and length of the trips taken, and consequently the number and amount of fares due from the driver. Thus I design to prevent the annoyances and disputes and dishonest practices which are continually occurring as to passengers, drivers, and vehicle owners, in the matter of transportation of passengers by cabs and similar vehicles, due chiefly to the absence of any accurate record of the time consumed.

Further objects of my invention are to indicate the character of the route or routes over which the vehicle is taken—that is to say, whether rough or smooth roads or streets have been traveled, and to record the number of stops that have been made in any one trip.

To these ends my invention consists of the apparatus, its parts, and combination of parts, as hereinafter more fully described and particularly claimed.

My invention is illustrated in the accompanying drawings, in which—

Figure 2:
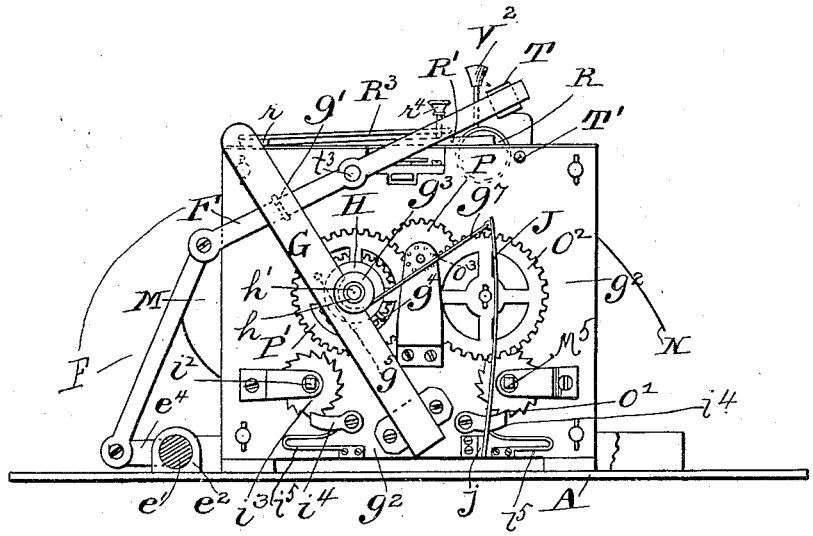
Figure 3:
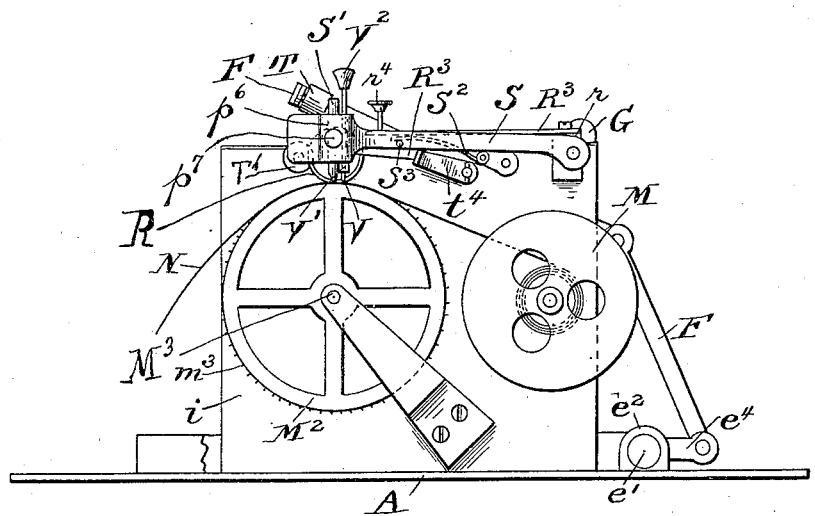

Figure 1 is an exterior front view in elevation of the apparatus, showing the same in condition when the vehicle is "for hire," and in dotted lines the position of the signal-bar when down and the vehicle is employed in making a a trip; Fig. 2, a front view in elevation with outer case, signal-bar, and dial-plate removed; Fig. 3, a rear view of the same; Fig. 4, a plan view, on an enlarged scale, with outer casing and top removed; Fig. 5, an end elevation of the machine made from the left of Fig. 1, and Fig. 6 a diagram showing the record made by the apparatus during a portion of one day.

Reference being had to the drawings, A represents a metal base of the apparatus on which the operative mechanism is mounted.

B is a cover, hinged at one end to the base A and adapted to be closed down over the clock and recording mechanism hereinafter described, and be locked by hasp and padlock at $a$. The cover B is provided with a glass $b'$, through which can be seen a dial C. The face of the dial is divided off into twelve hours, which are subdivided into half and quarter hours, and then into five-minute spaces. A single time-hand D is employed with this dial.

E is a signal-bar mounted on a roller-shaft $e'$, which shaft is held in place, but so as to rotate, in lugs $e^2$ on the base of the machine. This signal-bar when standing upright is latched in a lug $e^3$ on the cover B, and held therein by a spring-arm $f$. The top of the signal-bar is provided with a plate $f'$, on which are printed the words "to hire" or equivalent words.

When the signal-bar is raised it indicates that the vehicle may be hired; when lowered, that it is occupied. When, also, the signal-bar is lowered it throws the dial-hand by intermediate means into engagement with a watchwork to the rear of a dial-plate. This is done by the aid of a jointed rocking beam F, pivoted to a lug $e^4$ on roller-shaft $e'$, to which shaft the signal-bar is also secured, as before described. The rocking beam F, when rocked, engages with a lug $g'$ on a spring-arm G. The spring-arm G is secured at its foot to the vertical plate $g^2$, extends upward between a clutch H and a flanged roller $g^3$, and has its upper end free. The clutch H, which is a disk provided on its inner face with a circle of teeth, is carried by a sliding sleeve $h$, mounted on arbor $h'$. The time-indicator hand D is provided with a sleeve $d'$, which slides on the arbor $h'$ and onto the sleeve $h$ of the clutch H. When the signal-bar E is raised, it brings one face of the rocking beam F against the face of the lug $g'$, which throws the spring-arm G back and the clutch out of engagement with the time mechanism. When the signal-bar E is lowered, the beam F is raised above contact with the lug $g'$, and the spring-arm G then forces the clutch into engagement with the time-gearing. There are also means for throwing the time-hand D back to its original position, XII, on the dial when the trip is ended and when the signal-bar is raised to indicate that the vehicle is again free to be hired. These means consist of a pin $g^4$ on the clutch H, which engages with a pin $g^5$ on the spring-arm G, the grooved roller $g^3$ on the clutch-sleeve $h$, a cord or wire $g^7$ wound on roller $g^3$ and attached to a vertical spring-arm J, the lower end of which latter spring is secured to a lug $j$ on the central plate $g^2$. When the signal-bar E is raised the clutch H is disengaged both from the time mechanism and the spring-arm G, and the force of the spring J exerted through the cord or wire $g^7$ on roller $g^3$ rotates the clutch-sleeve $h$, carrying the hand-sleeve $d'$, which action throws the dial-hand D back to its starting-point at XII.

The time mechanism consists substantially of a watch-movement, and the train of wheels comprises a barrel I containing the main-spring placed between the two plates $g^2$ and $i$ and on a winding-arbor $i^2$. On this arbor, outside of plate $g^2$, is a ratchet-wheel $i^3$, a click $i^4$, and spring $i^5$. The barrel I, provided with teeth $i^6$, engages with a pinion $k'$ on arbor $k$ and drives a wheel K. The wheel K engages with pinion $l'$ on arbor $l^*$ and drives a center wheel L on the hand-supporting arbor $h'$. The wheel L engages with a pinion $l^3$ and drives a wheel $L^2$ on the same arbor. The wheel $l^2$ engages with a pinion $l^4$ and drives a crown-wheel $L^5$ on same arbor. Crown-wheel $L^5$ engages with a pinion $l^5$ on the arbor of an escape-wheel $L^6$. The shaft of a balance-wheel $L^8$ is provided with pallets $L^7$, which engage with the escape-wheel $L^6$, as indicated in Fig. 5.

The recording mechanism for recording on a suitable strip of paper N the time consumed consists of a reel M at the rear of the machine on which the paper roll is placed, a large wheel $M^2$ placed at the side of the reel and over which the paper is fed from the reel and the periphery of which is armed with sharp pins or teeth $m^3$. These teeth, as shown, are arranged so as to perforate the paper with Roman numerals representing the hours, two dots for the half-hours, single dots between the half-hours for the quarter-hours, and a continuous row of dots below the former signs, each dot in which latter row representing five minutes. Thus the intervals of time recorded correspond to the divisions of time on the dial-plate. The pin-wheel $M^2$ is mounted on an arbor $M^5$, which runs through both the plates $g^2$ and $i$. Between the plates said arbor is provided with a pinion $m^4$, which engages with teeth on a large barrel O, mounted on arbor $M^5$, and provided internally with a coiled spring. The arbor $M^5$ is squared to admit of being turned, and thus winding the record mechanism by a key, and is also provided with a ratchet-wheel $o'$ and spring-click $i^4$ $i^5$. The end of arbor $M^5$, outside of plate $g^2$, is provided with a wheel $O^2$, which wheel engages with a pinion $o^3$ on the arbor of a smaller back center wheel P. This wheel meshes directly with a back wheel $P'$ of the same size on the arbor $h'$, and another front wheel $P^2$ on arbor $h'$ and of the same size as wheel $O^2$ engages with the pinion $o^3$, before mentioned. Thus the time-train and the recording-train are connected and coact.

The strip of paper is fed forward by the action of the perforating pin-wheel. For the purpose of holding the paper to the wheel a roller R is fixed in the end of a spring-pivoted arm $R'$. To regulate the pressure of the roller on the paper strip I provide an arm $R^3$, one end of which is secured to a flat plate $r$ on top of the vertical plate $i$, and the other end provided with a set-screw $r^4$ bearing on the arm $R'$.

To indicate clearly the duration and termination of each trip I provide a rocking arm S, carrying a pencil $S'$, which pencil bears upon the paper strip. The pencil in its supporting-arm is held down on the paper by means of a spring-rod $S^2$, which rod is secured at one end to the roller-arm $R'$, while its free end bears upon a pin $S^3$ on the pencil-arm. As the trip continues the pencil $S'$ draws a heavy black line, as indicated at $w$. When the trip is terminated the signal-bar E is raised, which rocks the beam F, before described. The rocking beam F is provided at its outer end with a roller T, which, as that end of the beam is either raised or lowered, presses against the end of a rod $T'$ resting loosely in the plates $g^2$ and $i$, and this action presses the rod against the spring-bar in which the pencil rests, thus causing the pencil to make a vertical mark on the paper, as at $w'$, and thus recording the beginning or the terminus of the trip, accordingly as the signal-arm E is lowered or raised. When the pencil has made the mark at the end of the trip, the signal-bar still continues to be lifted, carrying the roller T above the rod $T'$, and the pencil is then raised from the paper by a lever $t^4$ on the end of a roller-shaft $t^3$, to which the rocking beam F is secured. As shaft $t^3$ rotates it raises the lever $t^4$, which in turn lifts the pencil-supporting arm S. The pencil described is placed in a bracket $p^6$, and its height regulated by means of a set-screw $p^7$. The strip of paper on which the record is made I prefer to call the "route-strip," for convenience.

V is a pencil consisting of a loose piece of lead put into a socket V', secured on the side of the roller-arm R', and which lead rests loosely on the paper, but is held in contact therewith by a weighted rod V², which is placed in the socket V' so as to rest on the lead. The pencil V is always in contact with the route-strip, and as the route-strip is being continuously carried forward this pencil will always record a straight line; but such line will vary in matter of shading, being either heavy or light, according as the vehicle is moving or standing still, and, also, as the vehicle moves over rough or smooth ground or pavement. Such a line is indicated by Z in Fig. 6. The especial function, therefore, of pencil V is to indicate the character of the entire day's service, while the vehicle has been in motion or at rest.

The character of each separate trip during the time of the trip is indicated by the pencil S'. When the vehicle is in motion the line made by that pencil will be heavier. When the vehicle stops during the trip the length of time of such stoppage is recorded by the lighter line, as indicated by Z' in Fig. 6. The record made by both pencils is made in separate lines on the route-strip and parallel with the time-division on the same strip.

It must be borne in mind that the divisions of time into hours, halves, quarters, and minutes on the dial correspond exactly with the divisions of time on the route-strip.

The character of the record made by the operation of my apparatus is illustrated in Fig. 6, which covers, say, a period of about six hours—say from 12 m. to 6.30 p.m.—and which represents the number of the trips, the intervals of time unemployed, the number of stoppages during each trip, and the time of beginning and end of each trip.

The apparatus is shown as provided on its under side with straps c, by which it can be secured to a rod on the front of the vehicle at the back of the driver's seat. It is intended that the dial shall front the passenger, so that he can inspect the same readily from the inner part of the vehicle. The forward construction of the box and the form of signals, levers, and the construction of the time-train and recording-train can be varied mechanically without departing from the principle of my invention.

Having thus described my invention, what I claim is—

1. In combination with a passenger vehicle, a time and trip recording apparatus, said apparatus comprising a disconnecting dial provided with a hand and with time divisions and characters, a continuously going time train, a signal lever adapted to throw said dial and time train into and out of connection at intervals, a continuously moving recording train connected and coacting with said time train, means for such connection, a recording wheel connected with said recording train and provided with means for imprinting upon a strip characters corresponding with those on said dial, the strip on which said characters are imprinted, and a reel for carrying said strip, whereby a continuous time movement as well as separate time intervals are recorded by said apparatus, substantially as described.

2. The combination with a dial and dial hand, of a time mechanism, a winding recording train mechanism, a gearing for connecting the said mechanism, a signal rocking lever E for throwing into engagement said dial and time mechanism, a route strip reel, a recording wheel provided with projections connected with said recording train, and over which wheel said strip is fed, a recording pencil g', a pivoted arm S carrying said pencil, a spring rod S² secured at one end to said arm while its opposite end bears against the pencil arm to keep the said pencil in contact with the paper, a rocking shaft on which said arm is mounted, a rocking beam F connected to the shaft of said signal lever, a rotating shaft $t^3$ connected at one end to said beam and its opposite end provided with a lever $t^4$ to bear against the under side of said pencil supporting arm, whereby the said pencil is moved into or out of contact with said strip when the signal bar is raised or lowered, substantially as described.

3. In combination with the hinged casing, provided with a lock and window, of the signal lever E pivoted outside of said casing, a rotating shaft e' extending through said casing to which the signal lever is pivoted, a dial plate divided into hours and portions of hours, within said casing and behind said window, a single hand on said dial plate, a central arbor on which said hand is secured, a sliding sleeve carrying a clutch, on said arbor, a time mechanism within said casing, an intermediate jointed rocking lever F pivotally connected to said rotating shaft, a spring arm G provided with a lug with which said rocking lever engages, said spring arm G connecting said clutch and the shaft on which the signal lever is mounted, whereby the casing can be locked, and the time mechanism at the same time be thrown into and out of operation with the dial by the movement of said signal lever, outside of said casing, substantially as described.

4. A winding recording mechanism consisting of a train gearing, in combination with a rotating wheel fixed on a main arbor of the said recording mechanism, said wheel provided on its periphery with teeth or pins, a record strip passing over said toothed wheel, a reel from which said strip is fed, a roller arm for holding down the strip on said toothed wheel, a spring arm and set screw for regulating the pressure of said roller, and a pencil supported on said spring arm held in a socket so as to rest loosely on the said strip, whereby a continuous line is marked on said strip, as well as variations in said line made by various movements of the apparatus while the vehicle is in motion, substantially as described.

5. The vertical spring arm, G, provided with a lug, $g'$, in combination with the rocking beam, the signal lever, the sliding sleeve and clutch, the arbor on which the clutch is carried, the dial hand carried on the clutch sleeve, and the time train, whereby on lowering or raising the signal lever, the said dial hand is thrown into or out of engagement with the time train, substantially as described.

6. In combination with the signal bar, and a rocking beam, the spring arm, G, provided with a pin, $g^5$, the sleeved clutch provided with a pin, $g^4$, the grooved roller, $g^3$, on the clutch sleeve, a vertical spring, J, provided with a cord, $g^7$, to pass over said roller, $g^3$, whereby when the signal bar is raised at the end of the trip, the said dial hand will be thrown back to its original position, substantially as described.

7. The combination with the signal bar, of the rocking beam provided at its outer end with a roller, a movable horizontal rod against the end of which said roller is adapted to press, the spring pivoted bar carrying the fixed pencil, against which bar the said movable rod abuts, and a record strip against which said pencil bears, whereby when said signal bar is raised or lowered, the said pencil is forced forward or back to record the end or beginning of a trip, substantially as described.

8. In combination with the reel and the route strip, the wheel $M^2$ provided on its periphery with separate series of projecting points, one series of points to perforate the strip with characters to represent the hours, the remaining series to respectively perforate half hours, quarter hours, and spaces of five minutes, a dial provided with a hand and provided with the characters corresponding to those of said wheel, and intervening operating and connecting and disconnecting mechanism, whereby the said wheel will continue to record said characters when the dial hand is at rest, substantially as described.

9. In combination with the route strip, the recording wheel, and the pressure roller for pressing the strip on said wheel, the pencil carried by said roller arm and continuously bearing on the strip, but free to move up and down in its support, substantially as and for the purpose described.

In testimony whereof I affix my signature in presence of two witnesses.

LAURA M. VA. DE GONZALEZ.

Witnesses:
H. A. ESCALANTE,
H. SEAULZRAJIDA.